Jan. 23, 1951  H. J. BIERMAN  2,539,226
DEVICE FOR TREATING FOOD MATERIAL
Filed June 24, 1947  2 Sheets-Sheet 2

INVENTOR
Hubert J. Bierman
BY
HIS ATTORNEY.

Patented Jan. 23, 1951

2,539,226

UNITED STATES PATENT OFFICE 2,539,226

DEVICE FOR TREATING FOOD MATERIAL

Hubert J. Bierman, Chatham, N. J., assignor to Ingersoll-Rand Company, New York, N. Y., a corporation of New Jersey Application June 24, 1947, Serial No. 756,678

1 Claim. (Cl. 99—240)

This invention relates to a processing apparatus, and more particularly to a device for treating food material.

One object of the invention is to restore to the food material such nutritive substances as may become separated during the processing thereof.

Other objects will be in part obvious and in part pointed out hereinafter.

Figure 1:
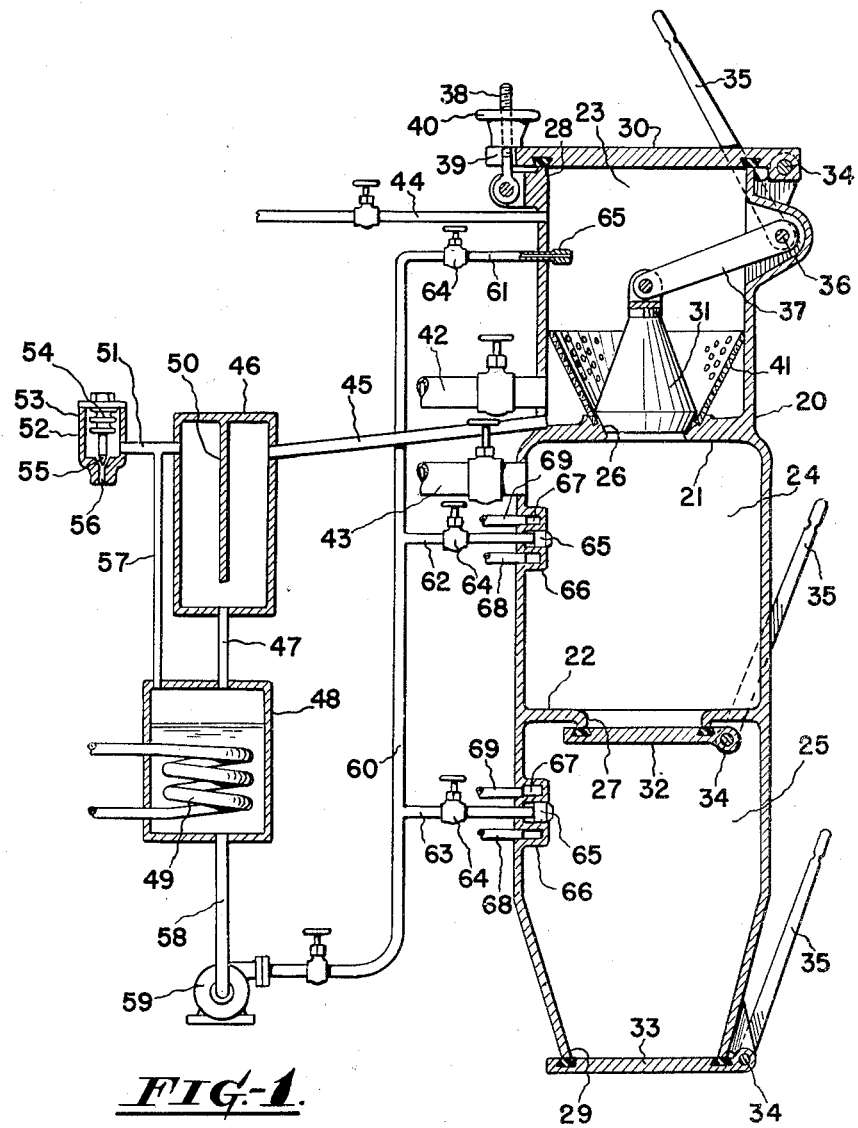
Figure 2:
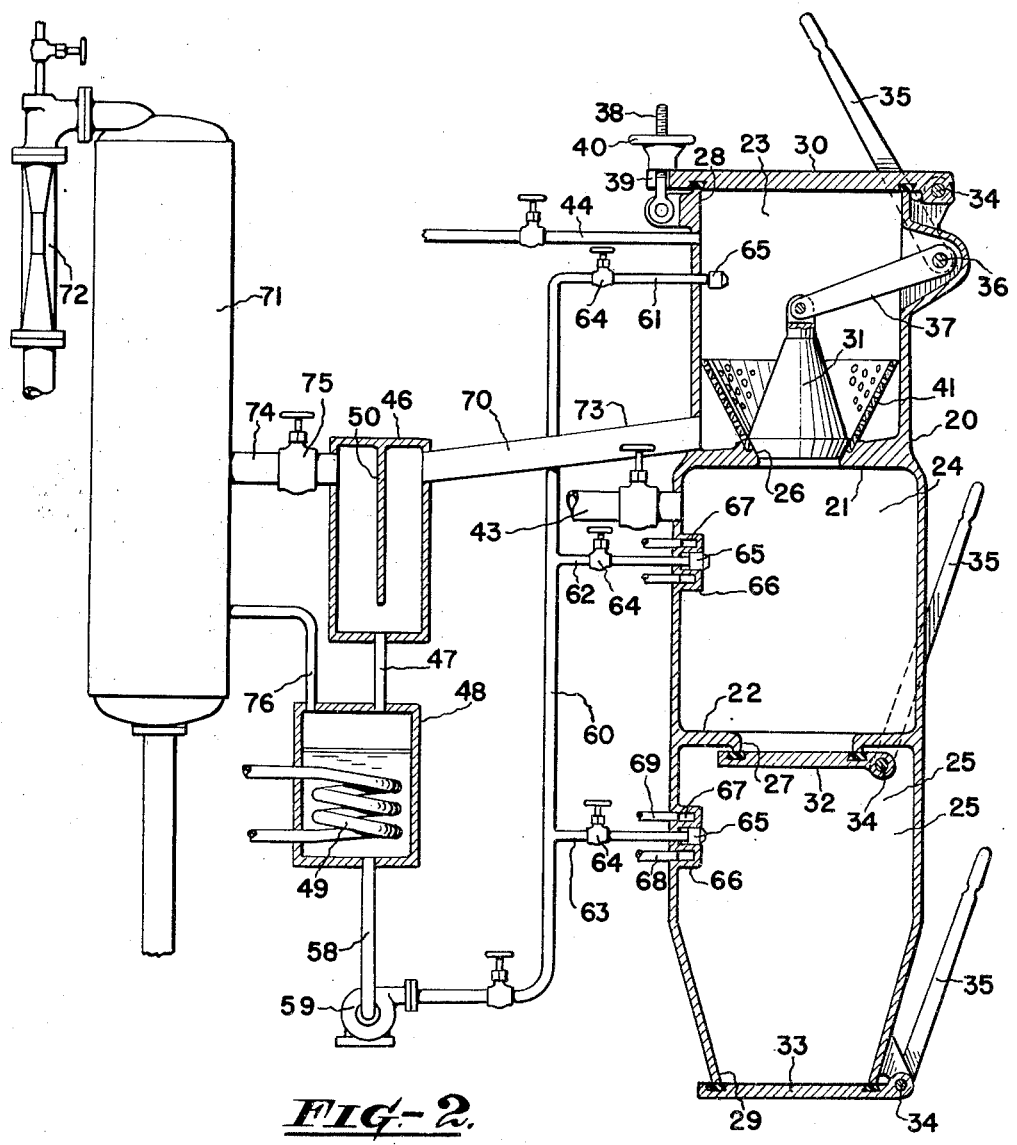

In the drawings accompanying this specification and in which similar reference numerals refer to similar parts, Figure 1 is an elevation, partly in section, of a device for treating food material and showing it applied to a food blanching and freezing apparatus, and Figure 2 is a view similar to Figure 1 showing a modified form of the invention.

Referring more particularly to the drawings, the invention is shown applied to a food processing apparatus of the type disclosed in United States Patent No. 2,407,482 to F. B. Doyle, September 10, 1946, and which includes a casing 20 having transverse walls 21 and 22 to divide the interior thereof into a blanching chamber 23, a freezing chamber 24 and a storage chamber 25.

The walls 21 and 22 have discharge openings 26 and 27 through which food passes from the blanching chamber 23 to the freezing chamber 24 and from the latter chamber to the storage chamber 25. The food is placed into the blanching chamber 23 through an inlet opening 28 at the upper end of the casing and passes from the casing 20 through a discharge opening 29 at the lower end of the storage chamber 25.

Closures are provided for the openings 28, 26, 27 and 29, respectively, in the form of a plate 30, a valve 31 and plates 32 and 33. The plate closures are each pivotally connected to the casing by pins 34, and the plates 32 and 33 are provided with levers 35 that lie exteriorly of the casing 20 for shifting the plates. The valve 30 is also actuated by a lever 35 lying exteriorly of the casing 20 and suitably connected to a pivot pin 36 seated in the casing 20 and attached to an end of an arm 37, the opposite end of which is pivotally connected to the valve 31. The arrangement is such that when the lever 35 is rocked in one direction the valve 31 is lifted into the blanching chamber to uncover the opening 26 and movement of the lever 35 in the opposite direction will lower the valve 31 into sealing engagement with the wall of the opening 26.

The plate 30 is held in the closed position by an eye-bolt 38 which is pivotally connected to the casing 20 and extends through a slot 39 in the plate. A nut 40, in the form of a hand-wheel, is threaded onto the eye-bolt 38 and seats upon the plate 30 for clamping it against the end of the casing 20.

Preferably, a perforated hopper 41 is disposed in the lower part of the blanching chamber 23 to guide the food to the opening 26 and to overlie the inlet end of a conduit 42 leading from the blanching chamber to a suitable evacuating device (not shown) which evacuates the blanching chamber for pre-cooling the food before discharging it into the freezing chamber 24. The freezing chamber 24 also has a conduit 43 to lead to such evacuator for effecting a vacuum of a value capable of effecting the quick freezing of the food material.

The steam used for blanching the food material is introduced into the upper portion of the blanching chamber 23 by a conduit 44.

In accordance with the practice of the invention, means are provided for restoring to the food material such substances of nutritive value, as for example minerals and vitamins, that become separated from the food particles and entrained in the condensate. It is essential that such broth be removed from the blanching chamber, otherwise it will be discharged into the freezing chamber and cause the food particles to freeze together in a mass or the broth will be drawn through the conduit 42 by the evacuating device and wasted. The blanching chamber 23 accordingly has a drain conduit 45 that opens into the blanching chamber at a point below the conduit 42 and leads to the upper portion of a vessel 46 the lower end of which communicates, through a conduit 47, with the upper end of a casing 48 containing a tubular coil 49 through which water may be circulated for cooling the condensate.

The vessel 46 is, in effect, a separator for separating the uncondensible gases from the condensate and accordingly has a baffle 50 depending from the upper end thereof to a point near its lower wall so that the condensate may flow freely along one side of the baffle to the conduit 47 and the uncondensible gases will flow around the free end of the baffle and upwardly along its opposite side for escape through a conduit 51.

The conduit 51 is connected to a casing 52 of a thermostatic trap 53 which may be of well known type having a thermostat 54 carrying a valve 55 that controls communication between the conduit 51 and an atmospheric port 56 in the casing 52. The thermostat 54 is normally contracted to hold the valve 55 in the unseated position and is extended for closing the valve 55 when subjected to a predetermined high temperature, as for example that of the steam used for blanching the food material. The thermostatic trap also serves as an escape for any uncondensible gases that may enter the casing 48 which is in constant communication with the conduit 51 through a conduit 57.

The cooled broth passes from the lower end of the casing 48 through a conduit 58 leading to the inlet side of a pump 59 the discharge end of which is connected to a conduit 60 having branches 61, 62 and 63 that lead, respectively, to the blanching chamber 23, the freezing chamber 24 and the storage chamber 25. Each branch has a valve 64 interposed therein for selectively controlling the delivery of broth to the chambers, and on the free ends of the branches are nozzles 65 to reduce the broth to a fine spray well suited for intimate admixtion with the food materials in the chambers.

In order to prevent the freezing of broth within the nozzles associated with the freezing and storage chambers, said nozzles are encircled by bosses 66 each having a channel 67 extending around the nozzle for the circulation of a heating medium and such heating medium is conveyed to and from the channels by conduits 68 and 69, respectively.

In the operation of the device, and assuming the valve 31 and the plates 30, 32 and 33 to be in their closed positions and the blanching chamber 23 to be charged with food material, the steam for blanching is admitted into the chamber 23 through the conduit 44 and will expel the air from the blanching chamber through the conduit 45, the vessel 46 and the conduit 51 and through the thermostatic trap to the atmosphere. When the steam reaches the thermostat 54 the latter will be extended and move the valve 55 into position to cut-off communication between the blanching chamber and the atmosphere.

During the subsequent blanching operation, any condensate formed in the chamber 23 will pass, together with such food substances as may become separated from the charge, through the conduit 45, the vessel 46 and the conduit 47 into the casing 48. There, its temperature is reduced materially in order to avoid the unnecessary flash cooling of the broth when it becomes exposed to the vacuum within the chambers 24 and 25.

The cooled broth is pumped from the casing 48 by the pump 59 through the conduit 60, and at given periods, as for example at the end of a blanching period or following the transfer of a batch of food from one chamber to another, the valves 64 are opened to spray broth over the food material which will issue from the processing apparatus without loss of weight and of the same nutritive value as originally.

In the form of the invention shown in Figure 2 the vessel 46 is interposed in a conduit 70 leading from the blanching chamber to a barometric condenser 71 which is evacuated by a jet ejector 72, this being an arrangement that is particularly suitable for use when blanching food materials at temperatures under 212°. The section 73 of the conduit 70 leading from the vessel 46 to the blanching chamber 23 opens into the latter at the bottom thereof and also serves to convey the broth from the blanching chamber to the vessel 46, and in the section 74 of the conduit 70 leading from the vessel 46 to the condenser 71 is a valve 75 for controlling communication between the blanching chamber and the condenser. The conduit 70 is of ample flow area so that the blanching chamber 23 may be quickly evacuated of air prior to the beginning of each blanching period, and the valve 75 provides a convenient means for cutting-off the condenser from the blanching chamber preparatory to a blanching operation.

The upper portion of the casing 48 is vented through a conduit 76 connected to the condenser 71 and is of small flow area as compared with that of the conduit 70 so that when the valve 75 is closed, as during blanching, only an inconsequential amount of fluid medium may escape from the blanching chamber to the condenser.

I claim:

In a device for treating food material, a casing having a blanching chamber and a freezing chamber to receive blanched food from the blanching chamber, means for discharging blanching steam into the blanching chamber, a cooler, a conduit to convey condensate and entrained food substances from the blanching chamber to the cooler, a pump for returning cooled condensate and entrained food substances to the chambers and having a discharge conduit, nozzles in the discharge conduit for the chambers for reducing the condensate and food substances to the form of a spray for admixtion with food material in the chambers, heating means in the casing extending around the nozzle for the freezing chamber for maintaining the freezing chamber nozzle above a freezing temperature, and conduits for conveying heating medium to and from the heating means.

HUBERT J. BIERMAN.

REFERENCES CITED

The following references are of record in the file of this patent:

UNITED STATES PATENTS

| Number | Name | Date |
|---|---|---|
| 1,698,430 | Cribari | Jan. 8, 1929 |
| 1,943,775 | Taylor | Jan. 16, 1934 |
| 2,114,573 | Rhodes | Apr. 19, 1938 |
| 2,249,792 | Skinner | July 22, 1941 |
| 2,344,151 | Kasser | Mar. 14, 1944 |
| 2,374,425 | DeWeerth | Apr. 24, 1945 |
| 2,379,518 | Hall | July 3, 1945 |
| 2,407,482 | Doyle | Sept. 10, 1946 |